(No Model.)

S. D. STROHM.
ELECTRICAL CONDUCTOR.

No. 278,289. Patented May 22, 1883.

WITNESSES:
Wm. H. Powell.
C. H. Amlaw

INVENTOR
Samuel D. Strohm,
By Connolly Bros.,
ATTORNEYS.

UNITED STATES PATENT OFFICE.

SAMUEL D. STROHM, OF PHILADELPHIA, PA., ASSIGNOR OF ONE-THIRD TO HARRISON SNYDER, OF SAME PLACE.

ELECTRICAL CONDUCTOR.

SPECIFICATION forming part of Letters Patent No. 278,289, dated May 22, 1883.

Application filed March 22, 1882. (No model.)

To all whom it may concern:

Be it known that I, SAMUEL D. STROHM, a citizen of the United States, residing at Philadelphia, in the county of Philadelphia and State of Pennsylvania, have invented certain new and useful Improvements in Electrical Conductors; and I do hereby declare the following to be a full, clear, and exact description of the invention, reference being had to the accompanying drawings, which form part of this specification, in which—

Figure 1:
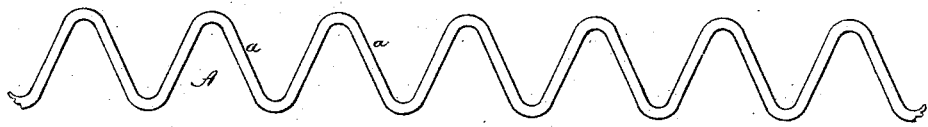
Figure 2:
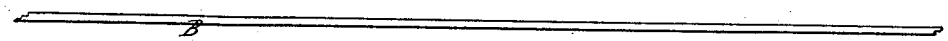
Figure 3:
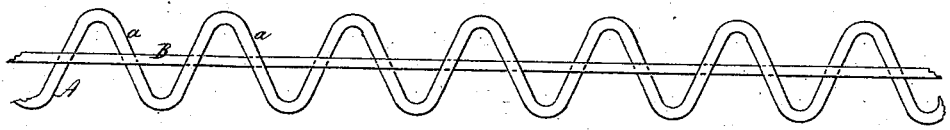
Figure 4:
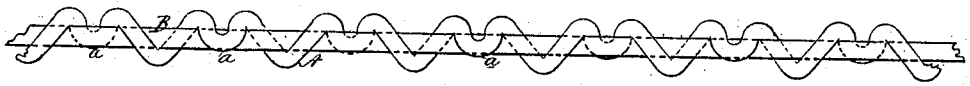

Figure 1 is a side elevation of corrugated wire. Fig. 2 is a plan of straight wire. Fig. 3 is a side elevation of two wires as arranged before corrugated wire is lapped. Fig. 4 is a side elevation of completed conductor, showing corrugated wire lapped over straight wire.

My invention has relation to that class of conductors in which a complete metallic circuit is afforded for the purpose of avoiding induction from neighboring conductors.

My invention has for its object to simplify the construction and reduce the weight and expense of these conductors, at the same time preserving perfectly their anti-induction properties.

My improvements consist of a metallic circuit composed of two wires, one of which is straight, or approximately so, the other being corrugated, the latter being lapped over the former, so as to retain both in a fixed relative position, as hereinafter set forth.

Referring to the accompanying drawings, which illustrate my invention, A and B are the two wires which compose my improved conductor. The wire A is corrugated, as shown, the corrugations being lettered a a, &c. After the corrugating has been done the teeth a a are bent over alternately in opposite directions, like the teeth of a crosscut-saw when set, so as to leave a channel or groove between them lengthwise of the wire A. In this groove the wire B is laid, the teeth a a being then bent over the latter to hold both firmly together. The conductor is now complete. The wires, of course, will be insulated before being formed into the improved conductor, and may be subsequently wrapped with any suitable insulating material or sheathed with lead or other metallic covering. As the wires A and B are of unequal length, the former, owing to its corrugating, being the longer, where they are designed to form a complete metallic circuit, they should have their diameters so proportioned that their resistances will be equalized. As one wire laps continually over the other, they are both practically equidistant from any neighboring conductor. Hence when joined at their ends to form a complete metallic circuit a neighboring conductor whose working-current sets up an induced current in one of them will generate a like current in the opposite direction in the other, such opposite currents neutralizing each other.

As the corrugations can be made readily by ordinary tools or machinery, and the wires easily arranged relatively to each other and fastened together, as described, without much skill, the improved conductor may be produced with great facility and at comparatively small expense.

What I claim as my invention is as follows:

The metallic circuit herein described, composed of two insulated wires, one of which is corrugated, the other being straight, or approximately so, the ribs or teeth of the corrugated wire being lapped over the other wire alternately from opposite sides, as set forth.

In testimony that I claim the foregoing I have hereunto set my hand this 8th day of March, 1882.

SAMUEL D. STROHM.

Witnesses:
WALTER S. GIBSON,
M. D. CONNOLLY.